(12) United States Patent
Bellino et al.

(10) Patent No.: US 6,860,983 B2
(45) Date of Patent: Mar. 1, 2005

(54) RECOVERY AND RE-USE OF ANODE OXYGEN FROM ELECTROLYTIC CELLS

(75) Inventors: Mark Bellino, Woodbridge (CA); Garfield Bryn Harris, Montreal (CA)

(73) Assignee: Hatch Ltd., Mississauga (CA)

( * ) Notice: Subject to any disclaimer, the term of this patent is extended or adjusted under 35 U.S.C. 154(b) by 186 days.

(21) Appl. No.: 10/193,729

(22) Filed: Jul. 11, 2002

(65) Prior Publication Data

US 2004/0007477 A1 Jan. 15, 2004

(51) Int. Cl.[7] .............. C25C 1/00; C25C 1/12; C25C 1/08; C25C 7/00
(52) U.S. Cl. .............. 205/560; 205/580; 205/599; 205/604; 205/633; 204/270; 204/278
(58) Field of Search ............... 205/580, 589, 205/599, 604, 633, 594, 560; 204/267, 268, 269, 270, 278, 277

(56) References Cited

U.S. PATENT DOCUMENTS

| | | | | |
|---|---|---|---|---|
| 2,321,367 A | | 6/1943 | Diggin | |
| 3,860,509 A | * | 1/1975 | Emmett, Jr. | 204/281 |
| 3,966,567 A | * | 6/1976 | Pace et al. | 205/353 |
| 4,075,069 A | | 2/1978 | Shinohara et al. | |
| 4,087,339 A | * | 5/1978 | Elliott et al. | 205/588 |
| 5,882,502 A | * | 3/1999 | Gomez | 205/568 |
| 6,120,658 A | | 9/2000 | Dunn et al. | |
| 6,537,440 B1 | * | 3/2003 | Richmond et al. | 205/580 |

* cited by examiner

Primary Examiner—Donald R. Valentine
(74) Attorney, Agent, or Firm—Woodling, Krost and Rust

(57) ABSTRACT

A process and apparatus for recovering a metal from a feedstock containing a compound of the metal. The process includes an electrowinning step in which a leachate comprising a salt of the metal, dissolved in an aqueous acid solution, is subjected to electrowinning in an electrolytic cell, wherein elemental metal is deposited on the cathodes of the cell and oxygen is generated at the anodes. The oxygen generated at the anodes is collected and is then at least partially consumed in an oxygen-consuming step of the process. Preferably, the oxygen-consuming step comprises an atmospheric or pressure leaching step in which the metal compounds in the feedstock become dissolved in a leachate in the form of metal salts, preferably sulfates. The recovery and use of anode oxygen in a leaching process encourages the use of mist-reducing technology in existing and new electrowinning facilities.

33 Claims, 9 Drawing Sheets

Impact of Fresh Oxygen Feed Purity on Benefits of Anode Oxygen Recycle

Impact of Feed Head Grade on Benefits of Anode Oxygen Recirculation

RECOVERY AND RE-USE OF ANODE OXYGEN FROM ELECTROLYTIC CELLS

FIELD OF THE INVENTION

This invention relates to the recovery of metals from metal-containing feedstocks by a process including an electrowinning step and an oxygen-consuming step, and particularly to such processes in which oxygen from the electrowinning step is recovered for use in the oxygen-consuming step.

BACKGROUND OF THE INVENTION

Some metals can be recovered from feedstocks such as ores, concentrates, mattes or alloys by processes which include an electrowinning step. Examples of such processes include the recovery of cobalt and nickel from feedstocks containing sulfides or oxides of these metals.

Electrowinning involves subjecting an electrolyte containing dissolved metal salts to electrolysis. Electrowinning is conducted in one or more electrolytic cells, each cell having a plurality of anode and cathode plates in alternating arrangement. During the electrowinning step, elemental metal is plated out at the cathode and, where the metal salt is a sulfate, for example, oxygen is evolved at the anode. The oxygen gas is evolved from the anode in the form of bubbles which rise to the surface of the electrolyte and burst. The bursting bubbles release the electrolyte into the atmosphere above the tank in the form of a fine mist or spray. This acidic mist is corrosive and hazardous to health of workers in the electrowinning tankhouse.

Hydrogen ions are also produced at the anode. In conventional cells, some of these hydrogen ions migrate to the cathode where they combine with electrons to produce hydrogen gas. The consumption of electrons by hydrogen ions can significantly reduce current efficiency in the electrolytic cell.

It is known to enclose the cathodes and/or anodes of the electrolytic cells in "bags", or in compartments separated by membranes or porous diaphragms, in order to improve current efficiency and to prevent generation of electrolyte mist in the space above the electrolytic cells. Examples of bagging technology are shown in U.S. Pat. No. 2,321,367 (Diggin), U.S. Pat. No. 4,075,069 (Shinohara et al.) and U.S. Pat. No. 6,120,658 (Dunn et al.).

The use of mist-reducing technologies such as bagging and compartmentalized cells is gaining increasing acceptance in various types of electrowinning circuits. In fact, anode bagging is considered to be highly desirable for nickel recovery and useful for cobalt recovery. The benefits of such technologies are often sufficient to convince designers and operators of electrowinning facilities to incorporate such technologies in new installations. However, the application of mist-reducing technology to older facilities can be challenging and expensive, and the benefits are usually insufficient to justify the capital commitment needed to modify existing infrastructures to accommodate the technology.

Therefore, there is a need for improved metal recovery processes which will encourage the use of mist-reducing technology in existing facilities and which will improve the efficiency and working conditions of both new and existing facilities.

SUMMARY OF THE INVENTION

The present invention at least partially overcomes the above-mentioned deficiencies in the prior art by providing an improved apparatus and process for recovering metals, the process including an electrowinning step in which anode oxygen is generated, and also including a step in which oxygen is consumed. Preferred uses for anode oxygen include smelting, atmospheric or pressure leaching, impurity removal, and use in converters, kilns, roasters and furnaces.

Preferably, the anode oxygen is recovered and re-used in an atmospheric or pressure leaching step. The leaching step comprises treatment of a feedstock as defined above with a leaching solution, usually an acidic aqueous solution. Leaching can be conducted either at atmospheric pressure ("atmospheric leach") or at elevated pressures ("pressure leach") in an autoclave. During the leaching process, metal compounds contained in the feedstock are converted to metal salts and are dissolved in the aqueous solution. Oxygen is usually added to the aqueous solution during the leaching process in order to maximize metal recovery and to minimize corrosion of plant equipment. The leachate produced during the leaching process is subsequently subjected to electrowinning to recover the metals from solution.

The recovery and re-use of anode oxygen is expected to provide additional cost savings, improved metal recoveries, improved throughput or improved impurity, the benefits being partly dependent on the oxygen-consuming step to which the anode oxygen is recirculated. Therefore, the present invention is expected to make mist-reducing technology more attractive in existing installations and in new installations.

In one aspect, the present invention provides a process for recovering a metal from a solid material containing the metal in the form of a metal compound, the process comprising: (a) leaching the solid material with an aqueous acidic solution in a vessel to form a leachate containing a salt of the metal in dissolved form; (b) subjecting the leachate to electrowinning in an electrolytic cell including a plurality of anodes, a plurality of cathodes and an electrolyte, whereby the metal is deposited on the cathodes in elemental form, and oxygen is generated at the anodes; (c) collecting the oxygen generated at the anodes; and (d) transferring the oxygen generated at the anodes to the vessel in which leaching takes place.

Preferably, step (d) of the process includes the addition of the oxygen directly to the aqueous acidic solution during the leaching step (a). Preferably, each of the anodes is covered by an anode bag.

In one preferred aspect of the invention, the leaching step (a) is conducted at atmospheric pressure, and the oxygen is collected under a partial vacuum. The partial vacuum is preferably applied by a blower which causes the oxygen collected from the anodes to flow to the vessel in which the leaching step is conducted.

In another preferred aspect of the invention, the leaching step (a) is conducted at elevated pressure and at a temperature greater than a temperature at which the aqueous acidic solution boils under atmospheric pressure, and wherein the vessel in which the leaching step is conducted is an autoclave. Preferably, the oxygen collected at the anodes has a purity of at least about 95% by volume, and is processed prior to being transferred to the vessel, for example by scrubbing, drying and pressurizing.

Preferably, the solid material which is fed to the leaching vessel comprises a feedstock containing from 10 to 40 weight percent of a metal in the form of a metal compound, which is preferably selected from one or more members of the group comprising oxides and sulfides of one or more metals selected from the group comprising nickel, cobalt, copper, zinc and lead. Inside the leaching vessel, the feedstock is leached with an aqueous acidic solution, preferably comprising a sulfuric acid solution. This generates a leachate containing dissolved metal sulfates.

In another aspect, the present invention provides an apparatus for recovering a metal from a solid material containing the metal in the form of a metal compound, the apparatus comprising: (a) a leaching vessel, preferably and autoclave, in which the solid material is leached with an aqueous acidic solution to form a leachate containing a salt of the metal in dissolved form; (b) an electrowinning apparatus comprising one or more electrolytic cells, each the cell containing a plurality of anodes, a plurality of cathodes and an electrolyte, wherein the electrowinning apparatus receives the leachate from the leaching vessel, and wherein the salt is selected such that, during electrowinning, the metal is deposited on the cathodes in elemental form and oxygen is generated at the anodes; (c) at least one oxygen collection device for collecting the oxygen generated at the anodes; and (d) transfer means for transferring the oxygen generated at the anodes to the leaching vessel.

Preferably, each of the anodes has an upper portion extending above a level of the electrolyte in one of the electrolytic cells, the apparatus further comprising a plurality of anode bags, each of the anode bags substantially sealing an upper portion of one of the anodes from contact with atmospheric air.

Each of the collection devices is preferably connected in sealed relation to at least one of the anode bags, such that the collection device communicates with a gas space within each of the anode bags to which the collection device is connected. Preferably, each collection device comprises at least one gas collection and overflow conduit, each the gas collection and overflow conduit extending from one of the anode bags at the level of the electrolyte, with the gas collection and overflow conduit preferably extending substantially horizontally from one of the anode bags at the level of the electrolyte.

The collection device preferably also comprises a vent header for receiving oxygen gas from a plurality of the gas collection and overflow conduits, and a pressure control device communicating with the vent header.

The apparatus also preferably comprises an oxygen transfer conduit which transfers the collected oxygen gas, after scrubbing, drying and compressing, to an interior of the autoclave; a fresh oxygen inlet for feeding additional oxygen into the transfer means. The transfer means preferably comprises an oxygen transfer conduit extending from the oxygen collection device to the leaching vessel, and further comprises a blower for creating a partial vacuum to draw the oxygen from the anodes and through the oxygen transfer conduit, and a make-up air inlet for adding air to the oxygen transfer conduit.

According to a broader aspect of the present invention, in a process for recovering a metal from a material containing the metal in the form of a metal compound, the process including an electrowinning step in which a leachate comprising a salt of the metal dissolved in an aqueous acid solution is subjected to electrowinning in an electrolytic cell including a plurality of anodes, a plurality of cathodes and an electrolyte, and in which the metal is deposited on the cathodes in elemental form and oxygen is generated at the anodes; the improvement comprising: (a) collecting the oxygen generated at the anodes; and (b) consuming at least a portion of the oxygen generated at the anode in an oxygen-consuming step of the process.

Preferably, the oxygen-consuming step comprises a smelting step which is upstream of the electrowinning step, and in which the oxygen generated at the anode is used to combust fuel in a smelting furnace and/or to oxidize impurities in a converter. The oxygen-consuming step is preferably selected from the group comprising a hydrometallurgical impurity removal step; use of the oxygen in a kiln upstream of the electrowinning step, the oxygen being used to combust fuel or to chemically alter materials inside the kiln; and use of the oxygen in a roaster upstream of the electrowinning step, the oxygen being used to combust fuel or to oxidize materials inside the roaster.

BRIEF DESCRIPTION OF THE DRAWINGS

The invention will now be described, by way of example only, with reference to the accompanying drawings, in which.

DETAILED DESCRIPTION OF PREFERRED EMBODIMENTS

The preferred embodiments of the invention will now be described with reference to a metal recovery process which includes an electrowinning step, and also includes leaching as an oxygen-consuming step. However, it will be appreciated that the process of the invention may include an alternate or additional oxygen-consuming step. For example, anode oxygen recovered from the electrowinning step could instead, or additionally, be used in smelting, impurity removal, and in converters, kilns, roasters and furnaces.

Figure 1:
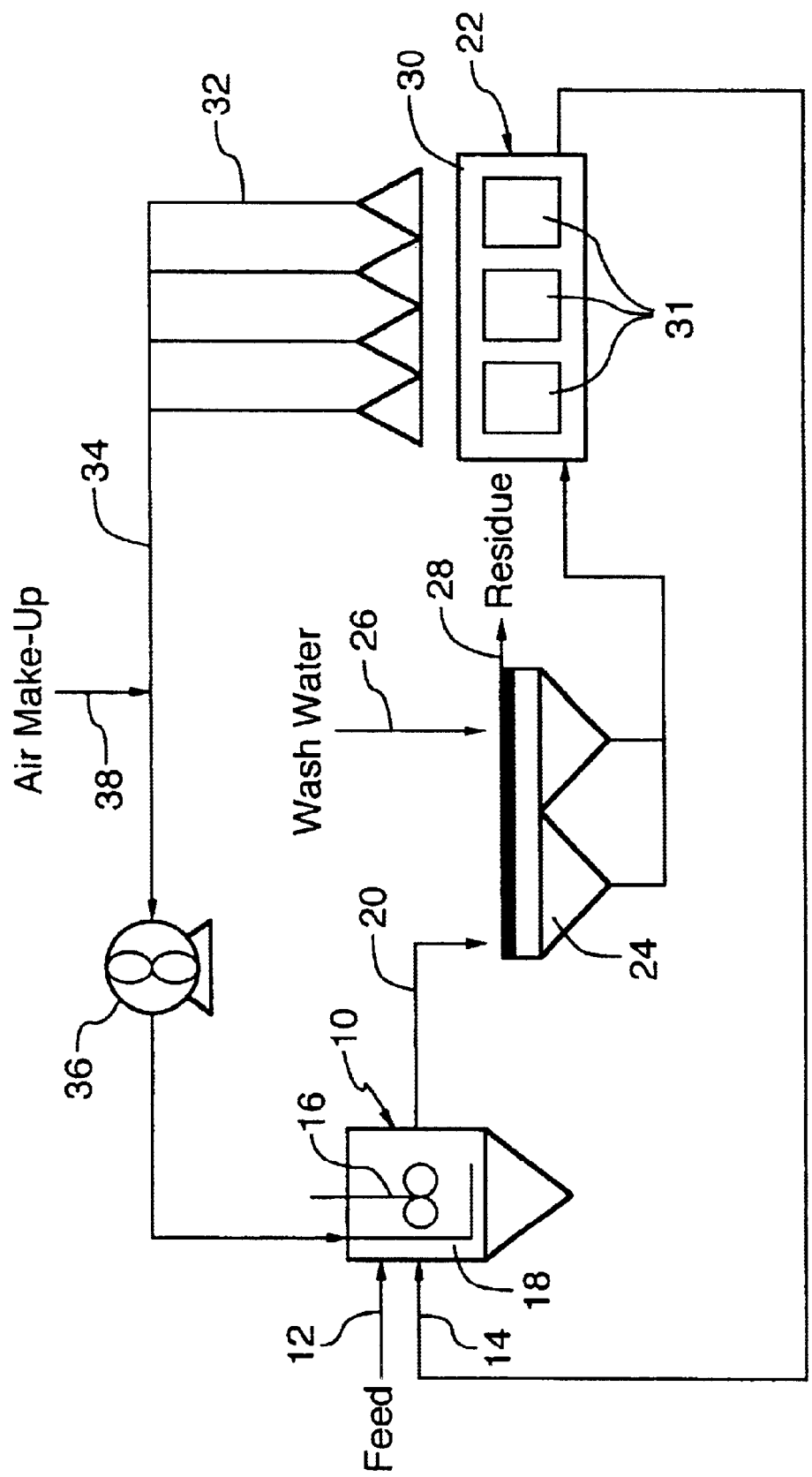
FIG. 1 is schematic diagram of an apparatus for use in a preferred metal recovery process according to the invention, in which the leaching step is performed at atmospheric pressure.
Figure 2:
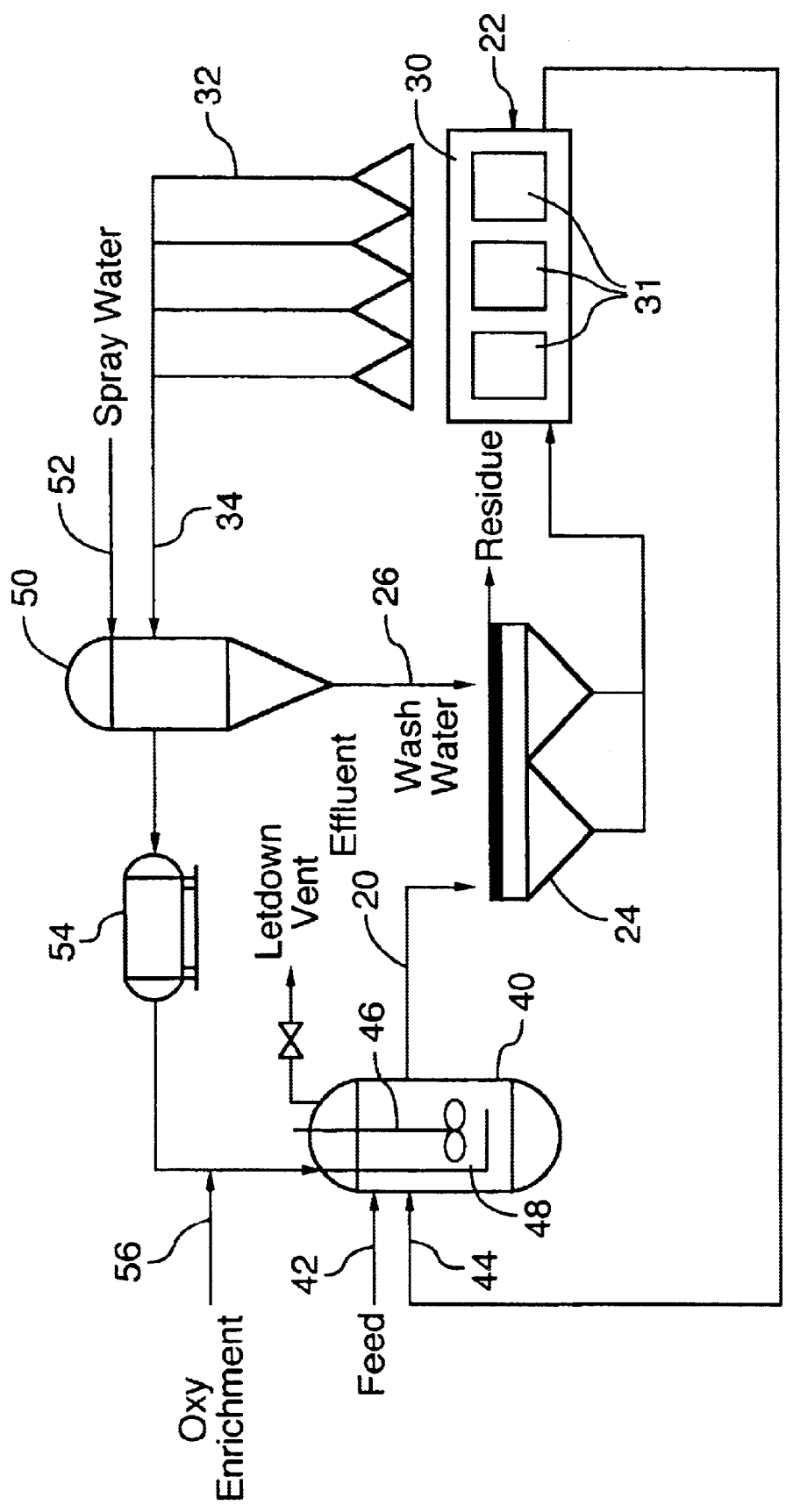
FIG. 2 is a schematic diagram of an apparatus used in another preferred metal recovery process according to the invention, in which the leaching step is conducted at elevated pressure.

FIGS. 1 and 2 schematically illustrate preferred processes and equipment for use in metal recovery processes according to the invention. The first step in the process comprises leaching of a metal-containing feedstock with an acidic, aqueous solution. In a preferred embodiment of the present invention, the feedstock is selected from the group comprising an ore, a concentrate, a matte or an alloy. Preferably, the feedstock contains metal in the form of a sulfide or an oxide, with the metal preferably being selected from copper, nickel, cobalt, zinc and lead. Most preferably, the feedstock contains nickel sulfide or cobalt sulfide. It will, however, be appreciated that the process of the present invention is applicable to all metal recovery processes including an electrowinning step in which oxygen is generated at the anode.

The metal content of the feedstock ("feed head grade") preferably ranges from about 10 to about 40 weight percent. In a particularly preferred embodiment, the feedstock contains nickel sulfide, with the feed head grade preferably being about 30 percent nickel by weight.

In the embodiment illustrated in FIG. 1, the leaching step is conducted at atmospheric pressure in an open tank 10. The feedstock is fed into the tank 10 through inlet 12 and an acidic aqueous solution is fed into tank 10 through inlet 14, thereby forming a slurry in the tank 10. The slurry is stirred by stirring device 16 and may be heated to a temperature below the boiling point of the acidic aqueous solution. Oxygen is introduced into the slurry through conduit 18.

The acidic aqueous solution converts the metal compounds in the feedstock to metal salts which become dissolved in the aqueous solution, thereby forming a leachate containing an amount of the salt in dissolved form. Most preferably, the acidic aqueous solution comprises sulfuric acid, which converts metal oxides and sulfides in the feedstock into soluble metal sulfates. Where the metal is lead, the acidic aqueous solution is preferably a fluosilic acid solution.

The leachate leaves the tank 10 through a conduit 20, through which it is transferred to an electrowinning apparatus 22. Preferably, the leachate is filtered to remove residue in a residue filtration device 24 before it enters the electrowinning apparatus 22, with wash water preferably being added through conduit 26 and residue being removed at 28.

Figure 3:
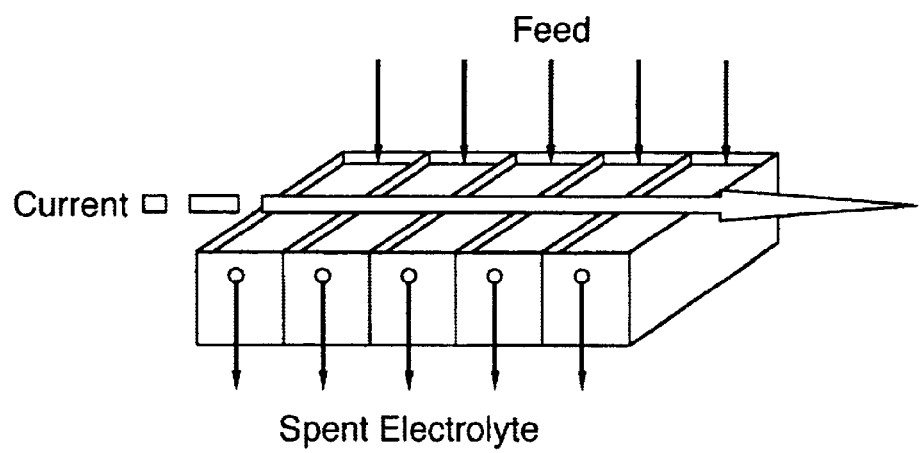
FIG. 3 is a schematic diagram showing the conventional arrangement of electrolytic cells in an electrowinning apparatus.

The electrowinning apparatus 22 shown in the drawings comprises one electrowinning cell 30, but may preferably comprise a plurality of such cells which may preferably be fed current in series and leachate solution in parallel, as schematically shown in FIG. 3. The electrowinning cell 30 contains an alternating arrangement of anode and cathode plates. Current is directed to the cathode where metal deposition most commonly occurs according to the following formulas:

$$Me^+(aq)+e^- \rightarrow Me(s) \qquad (I)$$

$$Me^{2+}(aq)+2e^- \rightarrow Me(s) \qquad (II)$$

The anionic half of the dissolved salt, for example sulfate ions, bridges the electrical circuit through the leachate solution. At the anode, a second reaction occurs to regenerate electrons and complete the electrical circuit as follows:

$$H_2O(l) \rightarrow 2H^+(aq)+\tfrac{1}{2}O_2(g)+2e^- \qquad (III)$$

As shown above, this reaction also generates hydrogen ions and oxygen gas. In systems which do not incorporate mist-reducing technology, some of the hydrogen ions migrate to the cathode where they generate hydrogen gas according to the following reaction:

$$2H^+(aq)+2e^- \rightarrow H_2(g) \qquad (IV)$$

Aside from being an increased safety risk, the generation of hydrogen gas at the cathode is undesirable as it increases power consumption through the consumption of electrons, thereby reducing current efficiency in the electrolytic cell to as low as 65%. In cobalt sulfate cells, it has also been shown that the formation of hydrogen at the cathode is directly responsible for elevating the sulfur content of the cobalt cathode through in-situ formation of hydrogen sulfide gas with free sulfide ions in the electrolyte. Furthermore, the generation of hydrogen at the cathode also results in the production of electrolyte mist.

An additional benefit of mist-reducing technology, as used in the process and apparatus of the present invention, is that enclosing the cathode and/or anode permits control of liquid levels surrounding the electrodes, ensuring that hydrostatic differences in liquid levels provide a continuous positive flow from the cathode to the anode. This flow resists or counter balances the migration of hydrogen ions to the catholyte (electrolyte surrounding the cathode), thereby maintaining a higher pH in the catholyte and suppressing the inefficient consumption of current. Typically, current inefficiencies are increased to 90% or better through the use of mist-reducing technology.

In the preferred system shown in FIG. 1, oxygen is collected at the anodes 31 of electrolytic cell 30 by an anode oxygen collection device 32. The anode oxygen collection device 32 transfers the collected oxygen to a conduit 34 which transfers the gas to the atmospheric leach tank 10. Preferably, the oxygen is withdrawn from electrolytic cell 30 by a partial vacuum. In the preferred embodiment shown in FIG. 1, a gas blower 36 is provided in-line with conduit 34 to supply a partial vacuum to withdraw the oxygen from the electrolytic cells and transfer it to the leach tank 10. Make-up air may be added at 38 should the volume of oxygen collected at the anodes be insufficient.

The embodiment of FIG. 2 differs from that shown in FIG. 1 in that it utilizes a pressurized leach step which is conducted in an autoclave 40. Some of the components of the system shown in FIG. 2 are similar or identical to those discussed above with reference to FIG. 1 and are identified by the same reference numerals in both FIGS. 1 and 2. As in the atmospheric leach described in connection with FIG. 1, the feedstock and the acidic aqueous solution are fed to the autoclave 40 through inlets 42 and 44, thereby forming a slurry inside the autoclave 40. The slurry is heated under pressure and is stirred by stirring device 46. Oxygen is introduced into the slurry through a conduit 48 extending into the autoclave 40. As described above in connection with FIG. 1, the leachate produced during the leaching process in FIG. 2 is transferred to an electrowinning apparatus 22, optionally undergoing residue filtration prior to entering the electrowinning apparatus as explained above.

In the system of FIG. 2, the oxygen is withdrawn from the anodes 31, preferably under partial vacuum, by anode oxygen collection device 32. Since the leach step in FIG. 2 is conducted under pressure, the oxygen must be pressurized prior to introduction into autoclave 40. Accordingly, the oxygen gas is preferably scrubbed and dried in scrubbing and drying apparatus 50, optionally with addition of spray water through conduit 52. The effluent is used as wash water in the residue filtration step, being fed into the reside filtration apparatus 24 through conduit 26. Once the oxygen gas has been scrubbed and dried, it is compressed by compressor 54 and is then fed to the autoclave 40, optionally being enriched with additional oxygen through conduit 56.

As mentioned above, it is necessary to maintain dissolved oxygen levels within the acidic aqueous solution during the leaching step. The dissolved oxygen concentration is significantly affected by the partial pressure of oxygen above the aqueous solution. Therefore, where pressure leaching is conducted in an autoclave, it is desirable to maximize the partial pressure of oxygen. In the present invention, this is preferably accomplished by minimizing dilution of the oxygen collected at the anodes. For this reason, it is preferred that the oxygen collection and re-circulation systems used in the system of the present invention are substantially sealed, regardless of the oxygen-consuming step which is utilized. For example, the use of a substantially sealed oxygen collection and re-circulation system is also preferred in atmospheric leach steps, since using oxygen of higher purity in the leach will improve reaction kinetics and process efficiency, thereby maximizing the recovery of metals and rejection of impurities.

Figure 4:
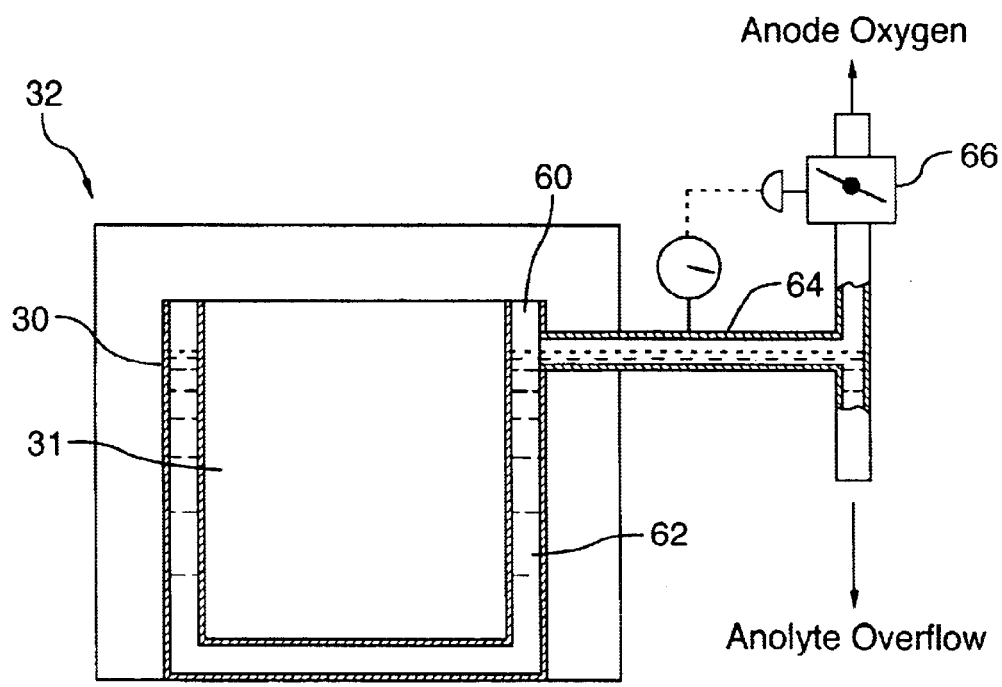
FIG. 4 is a schematic diagram showing one form of oxygen extraction equipment for use in the process of the invention.
Figure 6:
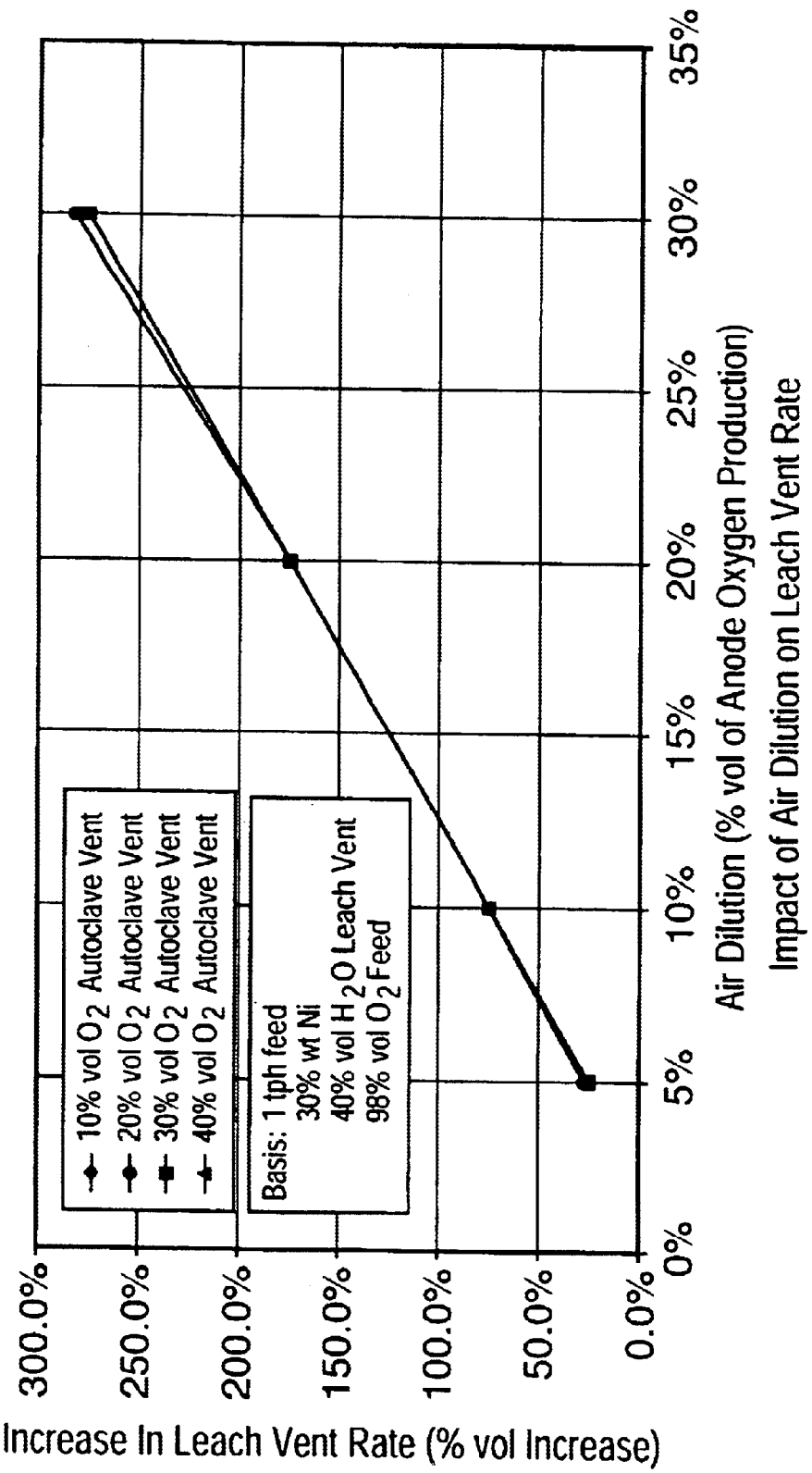
FIG. 6 is a graph showing the impact of air dilution on the leach vent rate.
Figure 7:
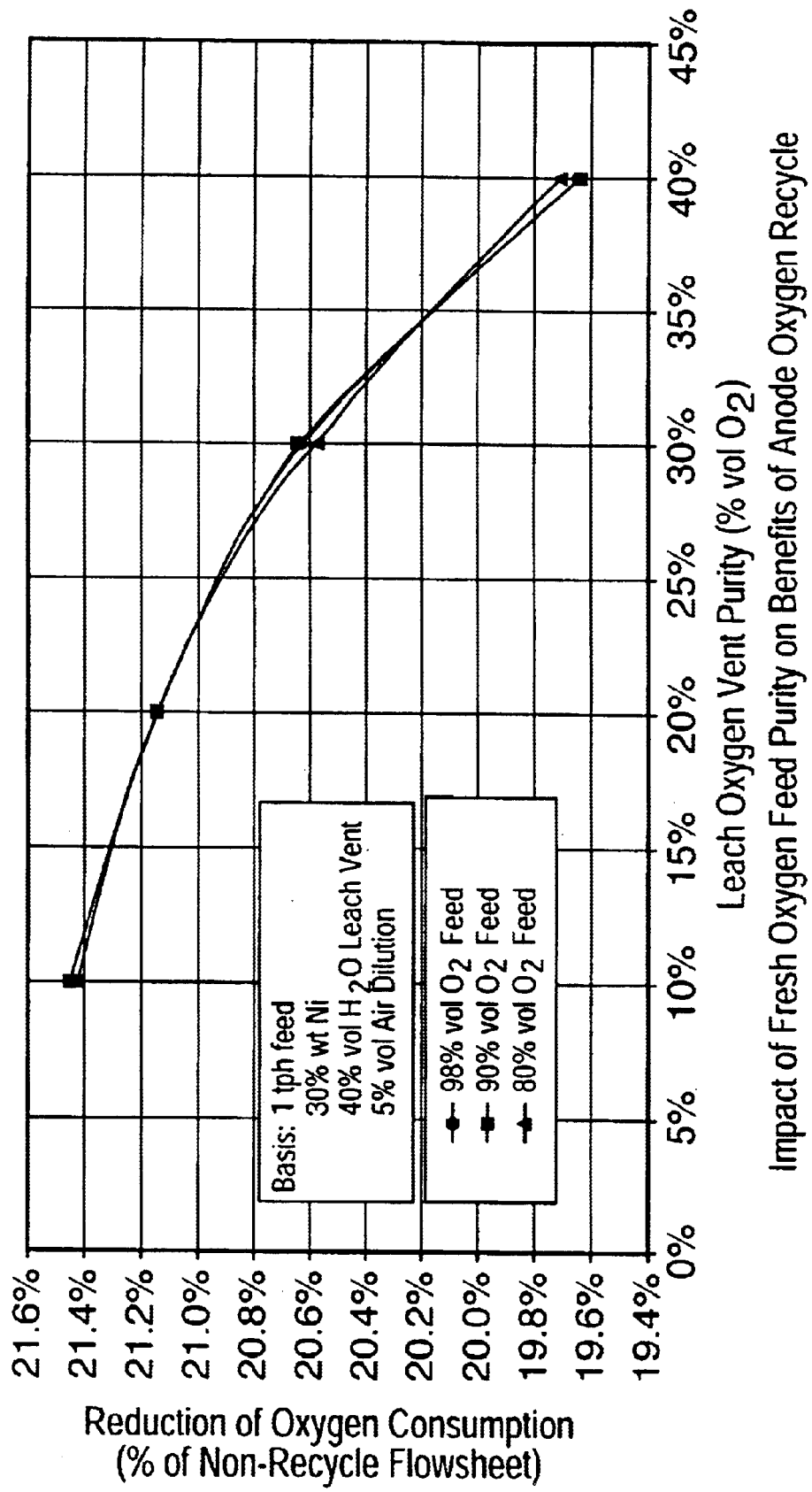
FIG. 7 is a graph showing the impact of fresh oxygen feed purity on the benefits to be achieved by anode oxygen recirculation.

A schematic illustration of a substantially sealed oxygen collection system is shown in FIG. 4. This drawing shows a transverse cross-section through an electrowinning cell 30 showing an anode 31 contained in a substantially sealed anode bag 60. As shown, an upper portion of the anode 31 projects above the level of electrolyte 62 in the anode bag 60. This upper portion of the anode bag is preferably substantially impermeable to gas, so as to prevent escape of the anode oxygen into the atmosphere. Although the anode bag 60 shown in FIG. 3 completely surrounds the submerged portion of anode 31, it will be appreciated that alternate anode bag arrangements may be provided in which the lower end of bag 60 is open. A bag with an open bottom is shown in FIGS. 6 and 7 of the above-mentioned Dunn et al. patent, which is incorporated herein by reference in its entirety.

Although the preferred embodiment of the invention utilizes anode bags, it will be appreciated that other arrangements are possible to capture oxygen gas produced at the anodes. For example, the electrowinning cell may preferably comprise a membrane or porous diaphragm divided cell in which separate anolyte and catholyte compartments are provided. A membrane or a porous diaphragm is used to separate the compartments. In this type of cell, oxygen may be recovered from the anolyte compartment and re-used in the process in the same way as discussed herein with cells having bagged anodes.

Preferably, the anode oxygen is collected directly above the liquid level in electrolytic cell 30 through a horizontal conduit 64 which also serves as an electrolyte overflow conduit to prevent excessive electrolyte levels in the anode bag 60. The oxygen is drawn off under vacuum from conduit 64, with a pressure control device 66 preferably being provided. The pressure control device may preferably comprise a vacuum relief valve or an in-line regulated damper.

Although the arrangement shown in FIG. 3 can avoid excessive dilution of the anode oxygen, some ingress of air is to be expected due to the relatively low oxygen production rate normally found at each anode, and the difficulty in effectively extracting the anode oxygen under vacuum without over-drawing the system. The ingress of air in any particular installation will be difficult to predict since it is influenced by a number of factors, including correct sizing and selection of equipment, and layout of duct work for oxygen collection. In an air-tight system, over-drawing the system through the application of excessive vacuum will disturb the hydraulic benefit gained by using anode bags to maximize current efficiency. Excessive vacuum will increase the electrolyte level in the anode bag and will consequently reduce or temporarily reverse flow in the bag and flood the cell, until a new flow equilibrium can be established. The pressure control device minimizes these effects on the hydrostatic equilibrium.

Figure 5:
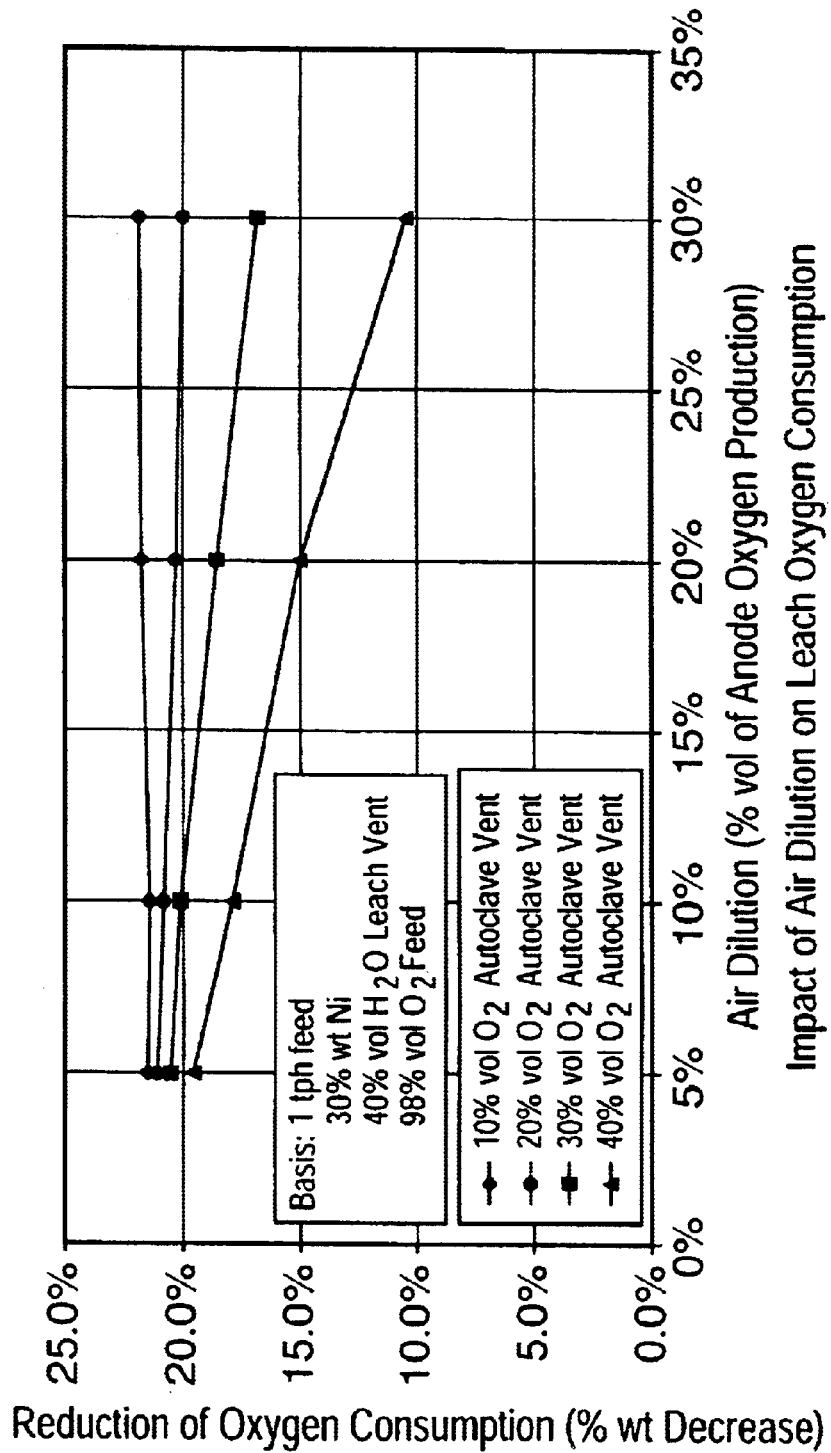
FIG. 5 is a graph showing the impact of air dilution on oxygen consumption during the leaching step.

FIG. 5 illustrates the benefit of anode oxygen re-circulation on the leach process for various gas compositions vented from the autoclave ("autoclave vent"), and also illustrates the diminishing benefit of increased air ingress at the anode. The y-axis of FIG. 5 is the percentage reduction in oxygen consumption achieved by re-circulation of anode oxygen. The x-axis is the percentage of air dilution in the anode oxygen. As demonstrated by FIG. 5, the additional nitrogen impurity introduced into the system increases the amount of oxygen feed required. This effect is more pronounced as the oxygen concentration in the autoclave vent gases is increased.

Figure 9:
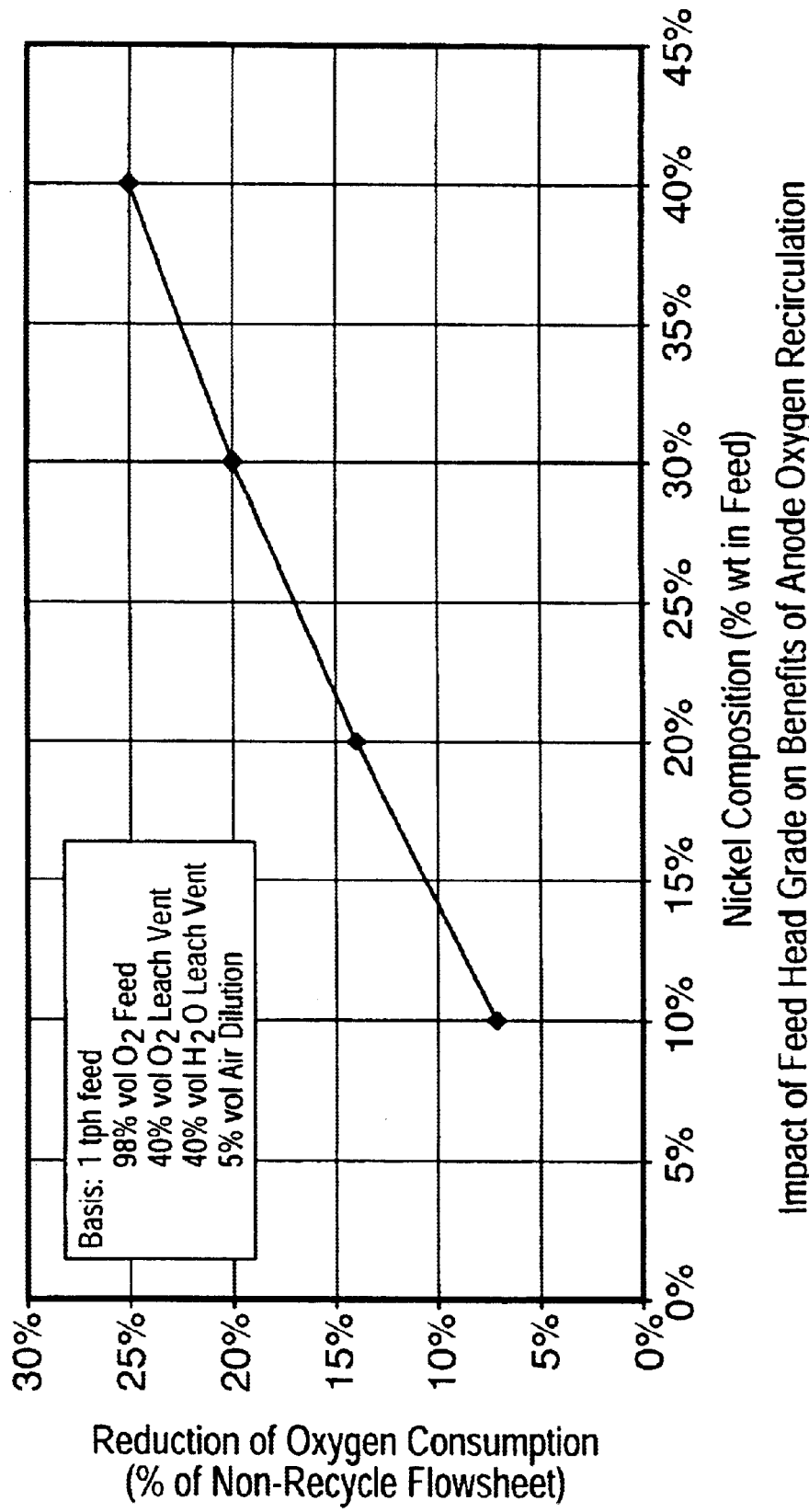
FIG. 9 is a graph showing the impact of feed head grade on the benefits to be achieved by anode oxygen recirculation.

The dilution of anode oxygen with air also significantly increases the rate at which gases must be vented from the autoclave. FIG. 6 demonstrates the effect of air dilution on the leach vent rate. The y-axis represents the increase in vent rate, and the x-axis represents air dilution of the anode oxygen. As shown in FIG. 9, increases in the leach vent rate of over 25% were calculated at dilution rates as low as 5%. Although some robustness is often built into autoclave vent systems, it is rarely the case that vent increases of 20% or more can be safely accommodated. For this reason, the air dilution rate of the anode oxygen is preferably maintained at or below 5% by volume. The effect observed in FIG. 6 is independent of the oxygen content in the gases vented from the autoclave.

FIG. 7 illustrates the impact of fresh oxygen feed purity on the reduction in oxygen consumption for various leach vent oxygen compositions. The y-axis represents the percentage reduction in oxygen consumption achieved by re-circulation of anode oxygen, and the x-axis represents the oxygen content of the leach vent gases. As shown in FIG. 7, the reduction in oxygen consumption is independent of the oxygen feed purity.

Figure 8:
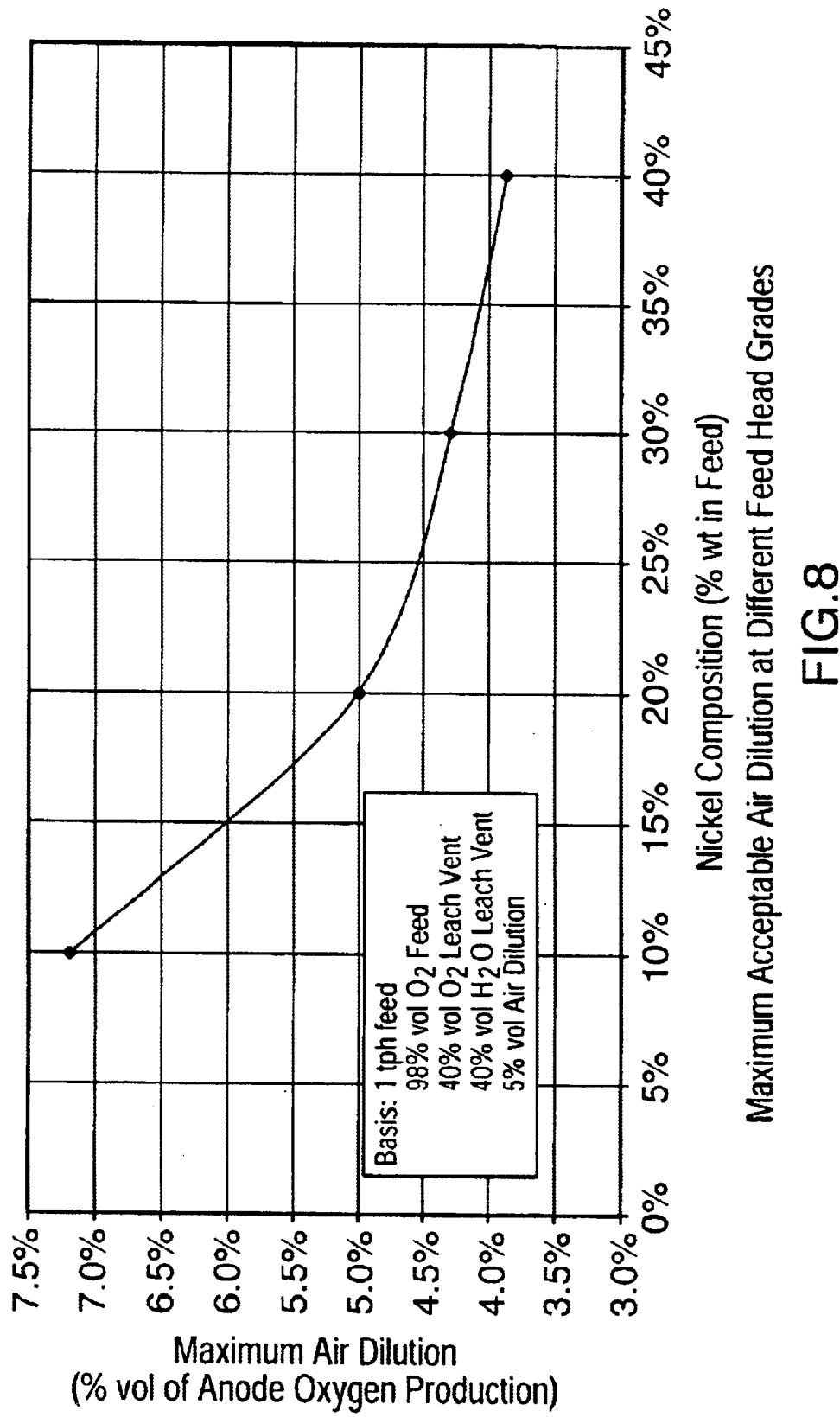
FIG. 8 is a graph showing the maximum acceptable air dilution at different feed head grades.

The graphs of FIGS. 5 to 7 assume that the feedstock contains 30 weight percent nickel. However, it will be appreciated that the metal content of the feedstock ("feed head grade") will be variable. FIG. 8 illustrates the maximum air dilution of the anode oxygen for feedstocks containing various amounts of nickel, with the maximum acceptable dilution rate being defined as the rate which produces a vent increase of 25% by volume. As shown by FIG. 8, there is an increasing sensitivity to air dilution for increasing metal content in the feedstock. This is due to the fact that, as the metal content is increased at a fixed feed rate, the production of metal at the cathode is increased, which in turn increases the amount of anode oxygen as a percentage of the total oxygen feed to the leach circuit. At increased re-circulation rates, smaller dilution rates are required to minimize the absolute amount of nitrogen being added to the leach circuit.

Once the maximum acceptable air dilution rate is found for each grade of feedstock, the benefit of anode oxygen re-circulation can be determined. Provided the constraints on maximum acceptable air dilution are met, the benefits of anode oxygen re-circulation are improved with increasing grades of feedstock. Again, this is because a greater proportion of the oxygen utilised in the process is recovered from the electrowinning process.

EXAMPLES

To ascertain the feasibility of limiting air dilution of the anode oxygen gases to 5% by volume, a typical example of an individual electrowinning cell is discussed below. Although electrowinning cells vary in shape and design, rough dimensions can be used to estimate the significance of 5% air dilution. In this example, the following type of cell is utilized:

Commodity plated: nickel
Cathode wetted width: 1 meter
Cathode wetted height: 1 meter
Cathode current density: 250 Amps/m$^2$
Current efficiency: 90% (bagged anodes)

In this type of cell, each cathode is fed 500 Amps, of which 450 Amps (90%) is utilized to plate nickel, with the rate of nickel plating being approximately 0.49 kg/hour. The rate of anode oxygen generation would be slightly less than 0.13 kg/hour. Assuming a gas temperature of 60° C. and gas pressure of 100 kPa, this would equate to a volumetric oxygen production per anode of approximately 0.11 m$^3$ per hour.

Figure 10:
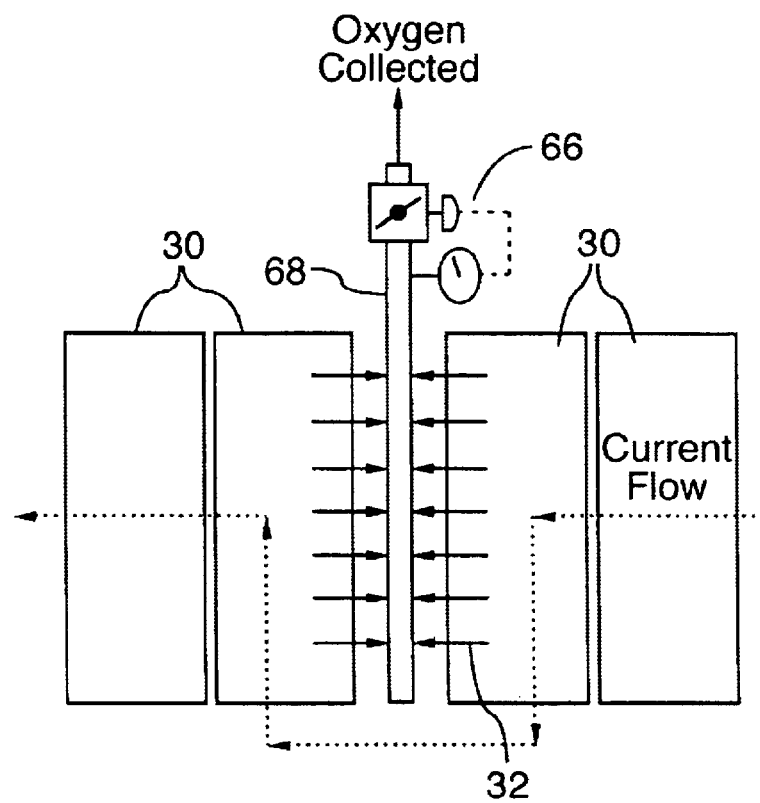
FIG. 10 shows a first preferred anode oxygen collection configuration.
Figure 11:
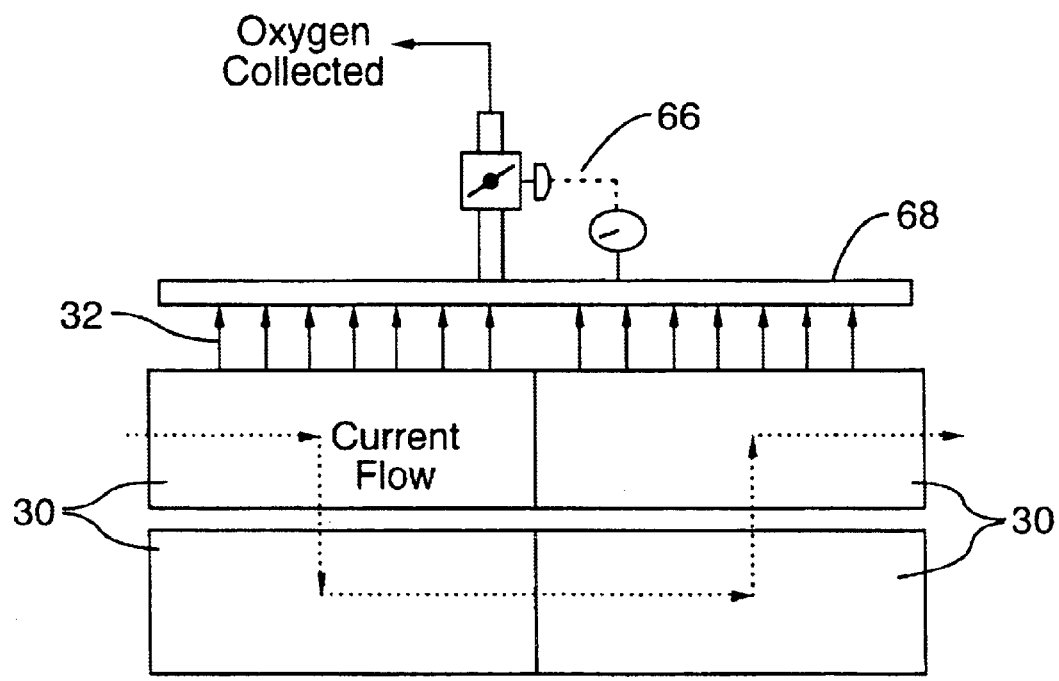
FIG. 11 shows a second preferred anode oxygen collection configuration.

In this type of cell, the rate of oxygen production at each anode is relatively low. At this low rate, it is impractical to expect efficient control over air dilution. For this reason, the oxygen collected from a number of anodes 31 of cells 30 by anode oxygen collection devices 32 is preferably piped to a common vent header 68 with a single pressure control device 66, as shown schematically in FIGS. 10 and 11. Each of the arrows shown in FIGS. 10 and 11 represents a pipe connecting a single anode within a cell 30 with the common vent header 68. This configuration makes it possible to collect gases from anodes in two or more electrolytic cells, depending on the cell configuration used. In a common vent collection of two cells, each having 31 anodes, the gas collection rate at the common header would increase to a more reasonable 6.8 m$^3$ per hour. This corresponds to a maximum air dilution of 0.34 m$^3$ per hour (5% volume dilution). Preferable, a common header is used to collect oxygen from as many anodes as possible. However, there is a practical limit to the number of anodes that can be collected by a single header. The larger the header, the greater the pressure differences experienced along the header, thereby making it difficult to collect oxygen efficiently without disturbing the hydrostatic equilibrium at each anode.

The inventors have demonstrated that the recovery and re-use of electrode oxygen could provide an additional benefit which makes the use of mist-reducing technology more attractive in existing facilities. The retrofitting of bags on the cathode or anode in existing facilities normally requires a change of the cell or electrode dimensions to accommodate the additional width required for the bags. Reduction of anode widths is not normally a favourable option as this could impact on product quality. These cell dimensional or arrangement modifications require changes to structural supports and result in lost productivity. As demonstrated above, this barrier can be overcome by the use of anode oxygen and the cost savings in consumption of new oxygen gas reagent.

The benefits of the invention have been discussed above with particular reference to cobalt and nickel electrowinning processes. These are often part of a larger plant incorporating atmospheric or pressure leaching circuits, and/or oxidative precipitation processes, requiring air, oxygen enriched air, or oxygen gas. The present invention permits a reduction in net oxygen consumption during the metal recovery process by recovering oxygen during electrowinning and re-using it in the leach step, which constitutes one of the major uses of oxygen in the metallurgical industry.

Although the preferred embodiments of the invention are described with reference to re-use of oxygen in the leach step, it will be appreciated that it may instead or also be used in other oxygen-consuming steps in the metal recovery process. In addition, the present invention can be applied to other electrowinning processes in which oxygen is generated at the anode. As mentioned above, the anode oxygen may instead, or additionally, be used in smelting, impurity removal, and in converters, kilns, roasters and furnaces. These alternate oxygen-consuming steps are now briefly described below.

A smelter is a plant which concentrates valuable metals, for example copper, nickel, cobalt, zinc, platinum group metals and precious metals by pyrometallurgical means. The most common smelting flowsheet begins by melting a feed material in a furnace to float off gangue impurities such as silica, alumina, iron oxide, lime and magnesia, producing a matte. The matte is then contacted with oxygen in a converter to oxidize most of the iron and some of the sulfur elements. The iron is removed by skimming and the sulfur is removed in the off-gas as sulfur dioxide. This produces a material which is suitable for processing by hydrometallurgical means, for example by leaching and electrowinning. In the process of the present invention, anode oxygen may be consumed by the burners which heat the contents of the smelting furnace, and/or the anode oxygen could be consumed in the converter in which iron and sulfur impurities are oxidized and removed.

The anode oxygen may be consumed in a hydrometallurgical impurity removal step such as oxidation precipitation which requires oxygen and which oxidizes impurities to insoluble compounds.

A kiln is a piece of equipment which is used to process materials at high temperatures (usually above 250° C.), but lower than the melting point of the material. Kilns are used for drying or sintering of materials, or to chemically alter feed materials to produce intermediate or final products. One common type of kiln is the rotary kiln, which essentially is a drum which rotates and moves material through its body form feed to discharge. Another common type of kiln is the belt kiln which has a moving belt to transport the material from the feed to the discharge. Anode oxygen could be used in a kiln to combust fuel which is used to maintain an elevated temperature within the kiln, and/or could be consumed in chemical reactions occurring within the kiln.

A roaster is generally situated upstream of a smelting plant or hydrometallurgical plant. Roasters remove impurities from feed materials by converting them to gaseous components which rise from the material. Roasters are also used to chemically alter materials to make them more amenable to the smelting or hydrometallurgical process. Anode oxygen could be used in a roaster to combust fuel which is used to maintain an elevated temperature within the kiln, and/or to cause chemical reactions within the roaster.

Although the invention has been described in connection with certain preferred embodiments, it is to be understood that the invention is not limited thereto. Rather, the invention includes all embodiments which may fall within the scope of the following claims.

What is claimed is:

1. A process for recovering a metal from a solid material containing said metal in the form of a metal compound, said process comprising:
   (a) leaching said solid material with an aqueous acidic solution in a vessel to form a leachate containing a salt of said metal in dissolved form;
   (b) subjecting said leachate to electrowinning in an electrolytic cell including a plurality of anodes, a plurality of cathodes an electrolyte, whereby said metal is deposited on said cathodes in elemental form, and oxygen is generated at said anodes;
   (c) collecting said oxygen generated at said anodes under partial vacuum; and (d) transferring said oxygen generated at said anodes to said vessel in which leaching takes place.

2. The process according to claim 1, wherein said step (d) includes the addition of said oxygen directly to said aqueous acidic solution during said leaching step (a).

3. The process according to claim 1, wherein said leaching step (a) is conducted at atmospheric pressure.

4. The process according to claim 1, wherein said partial vacuum is applied by a blower which causes the oxygen collected from the anodes to flow to the vessel in which the leaching step is conducted.

5. The process according to claim 1, wherein each of the anodes is covered by an anode bag.

6. The process according to claim 1, wherein said leaching step (a) is conducted at elevated pressure and at a temperature greater than a temperature at which said aqueous acidic solution boils under atmospheric pressure, and wherein said vessel in which said leaching step is conducted is an autoclave.

7. The process according to claim 6, wherein said oxygen collected at said anodes has a purity of at least about 95% by volume.

8. The process according to claim 1, wherein said salt is a sulfate of said metal.

9. The process according to claim 1, wherein said metal is selected from the group comprising nickel, cobalt, copper, zinc and lead.

10. The process according to claim 1, wherein said solid material is a feedstock containing from 10 to 40 weight percent of said metal as said metal compound.

11. The process according to claim 1, wherein said metal compound is selected from one or more members of the group comprising oxides and sulfides.

12. The process according to claim 1, wherein said aqueous acidic solution comprises a sulfuric acid solution.

13. A process for recovering a metal from a solid material containing said metal in the form of a metal compound, said process comprising:

(a) leaching said solid material with an aqueous acidic solution in a vessel to form a leachate containing a salt of said metal in dissolved form;

(b) subjecting said leachate to electrowinning in an electrolytic cell including a plurality of anodes, a plurality of cathodes and an electrolyte, whereby said metal is deposited on said cathodes in elemental form, and oxygen is generated at said anode;

(c) collecting said oxygen generated at said anodes; and (d) transferring said oxygen generated at said anodes to said vessel in which leaching takes place;

wherein the oxygen collected at said anodes is scrubbed and dried prior to being transferred to said vessel.

14. The process according to claim 13, wherein the oxygen collected at said anodes is pressurized prior to being transferred to said vessel.

15. The process according to claim 13, wherein said leaching step (a) is conducted at elevated pressure and at a temperature greater than a temperature at which said aqueous acidic solution boils under atmospheric pressure, and wherein said vessel in which said leaching step is conducted is an autoclave.

16. The process according to claim 15, wherein said oxygen collected at said anodes has a purity of at least about 95% by volume.

17. An apparatus for recovering a metal from a solid material containing said metal in the form of a metal compound, said apparatus comprising:

(a) a leaching vessel in which said solid material is leached with an aqueous acidic solution to form a leachate containing a salt of said metal in dissolved form;

(b) an electrowinning apparatus comprising one or more electrolytic cells, each said cell containing a plurality of anodes, a plurality of cathodes and an electrolyte, wherein said electrowinning apparatus receives said leachate from said leaching vessel, and wherein said salt is selected such that, during electrowinning, said metal is deposited on said cathodes in elemental form and oxygen is generated at said anodes;

(c) at least one oxygen collection device for collecting said oxygen generated at said anodes; and (d) transfer means for transferring said oxygen generated at said anodes to said leaching vessel;

wherein each of said anodes has an upper portion extending above a level of said electrolyte in one of said electrolytic cells, said apparatus further comprising a plurality of anode bags, each of said anode bags substantially sealing an upper portion of one of said anodes from contact with atmospheric air; and wherein each said collection device comprises at least one gas collection and overflow conduit, each said gas collection and overflow conduit extending from one of said anode bags at said level of said electrolyte.

18. An apparatus according to claim 16, wherein each said collection device is connected in sealed relation to at least one of said anode bags, such that the collection device communicates with a gas space within each of said anode bags to which said collection device is connected.

19. An apparatus according to claim 17, wherein said gas collection and overflow conduit extends substantially horizontally from one of said anode bags at said level of said electrolyte.

20. An apparatus according to claim 17, wherein said collection device further comprises a vent header for receiving oxygen gas from a plurality of said gas collection and overflow conduits.

21. An apparatus according to claim 20, wherein said collection device further comprises a pressure control device communicating with said vent header.

22. An apparatus according to claim 21, wherein said leaching vessel is an autoclave.

23. An apparatus according to claim 22, wherein said oxygen gas collected in said vent header is scrubbed and dried prior to being transferred to said autoclave by said transfer means.

24. An apparatus according to claim 23, wherein said oxygen gas is compressed prior to being transferred to said autoclave by said transfer means.

25. An apparatus according to claim 24, wherein said transfer means comprises an oxygen transfer conduit which transfers said collected oxygen gas, after scrubbing, drying and compressing, to an interior of said autoclave.

26. An apparatus according to claim 25, further comprising a fresh oxygen inlet for feeding additional oxygen into said transfer means.

27. An apparatus according to claim 17, wherein an interior of said leaching vessel is at atmospheric pressure.

28. An apparatus for recovering a metal from a solid material containing said metal in the form of a metal compound, said apparatus comprising:

(a) a leaching vessel in which said solid material is leached with an aqueous acidic solution to form a leachate containing a salt of said metal in dissolved form;

(b) an electrowinning apparatus comprising one or more electrolytic cells, each said cell containing a plurality of anodes, a plurality of cathodes and an electrolyte, wherein said electrowinning apparatus receives said leachate from said leaching vessel, and wherein said salt is selected such that, during electrowinning, said metal is deposited on said cathodes in elemental form and oxygen is generated at said anodes;

(c) at least one oxygen collection device for collecting said oxygen generated at said anodes; and (d) transfer means for transferring said oxygen generated at said anodes to said leaching vessel;

wherein said transfer means comprises an oxygen transfer conduit extending from said oxygen collection device to said leaching vessel.

29. An apparatus according to claim 28, said transfer means further comprising a blower for creating a partial vacuum to draw said oxygen from said anodes and through said oxygen transfer conduit.

30. An apparatus according to claim 29, wherein said transfer means further comprises a make-up air inlet for adding air to said oxygen transfer conduit.

31. An apparatus according to claim 28, wherein an interior of said leaching vessel is at atmospheric pressure.

32. In a process for recovering a metal from a material containing said metal in the form of a metal compound, said process including an electrowinning step in which a leachate comprising a salt of said metal dissolved in an aqueous acid solution is subjected to electrowinning in an electrolytic cell including a plurality of anodes, a plurality of cathodes and an electrolyte, and in which said metal is deposited on said cathodes in elemental form and oxygen is generated at said anodes;

the improvement comprising:

(a) collecting said oxygen generated at said anodes; and (b) consuming at least a portion of said oxygen generated at said anode in an oxygen-consuming step of said process;

wherein said oxygen-consuming step comprises a smelting step which is upstream of said electrowinning step, and in which said oxygen generated at said anode is used to combust fuel in a smelting furnace and/or to oxidize impurities in a converter.

33. In a process for recovering a metal from a material containing said metal in the form of a metal compound, said process including an electrowinning step in which a leachate comprising a salt of said metal dissolved in an aqueous acid solution is subjected to electrowinning in an electrolytic cell including a plurality of anodes, a plurality of cathodes and an electrolyte, and in which said metal is deposited on said cathodes in elemental form and oxygen is generated at said anodes;

the improvement comprising:

(a) collecting said oxygen generated at said anodes; and (b) consuming at least a portion of said oxygen generated said anode in an oxygen-consuming step of said process;

wherein said oxygen-consuming step is selected from the group comprising a hydrometallurgical impurity removal step; use of the oxygen in a kiln upstream of the electrowinning step, the oxygen being used to combust fuel or to chemically alter materials inside the kiln; and use of the oxygen in a roaster upstream of the electrowinning step, the oxygen being used to combust fuel or to oxidize materials inside the roaster.

* * * * *

UNITED STATES PATENT AND TRADEMARK OFFICE
CERTIFICATE OF CORRECTION

PATENT NO. : 6,860,983 B2
DATED : March 1, 2005
INVENTOR(S) : Bellino et al.

Page 1 of 1

It is certified that error appears in the above-identified patent and that said Letters Patent is hereby corrected as shown below:

Column 12,
Line 29, after "claim" delete "16" and insert -- 17 --.

Signed and Sealed this

Twenty-third Day of August, 2005

JON W. DUDAS
*Director of the United States Patent and Trademark Office*